C. E. HITE.
PRIMARY BATTERY.
APPLICATION FILED AUG. 16, 1906.

968,154.

Patented Aug. 23, 1910.

WITNESSES:
Mae Hofmann
Jas. C. Nobensmith

INVENTOR
Charles E. Hite,
BY
ATTORNEY

UNITED STATES PATENT OFFICE.

CHARLES E. HITE, OF BURLINGTON, NEW JERSEY.

PRIMARY BATTERY.

968,154.  Specification of Letters Patent. Patented Aug. 23, 1910.

Application filed August 16, 1906. Serial No. 330,773.

*To all whom it may concern:*

Be it known that I, CHARLES E. HITE, a citizen of the United States, residing at Burlington, in the county of Burlington and State of New Jersey, have invented a new and useful Primary Battery, of which the following is a specification.

My invention relates to improvements in primary batteries.

My object is to provide an improved battery and means for increasing its life and efficiency.

This invention relates to a two-fluid cell battery, and comprises improved means of construction including the use of porous plates between the electro-negative and the electro-positive plates in connection with partitions formed of electro-negative plates.

My invention comprises improved means for coating the receptacle and improved means for covering the liquids to prevent evaporation.

Figure 1:
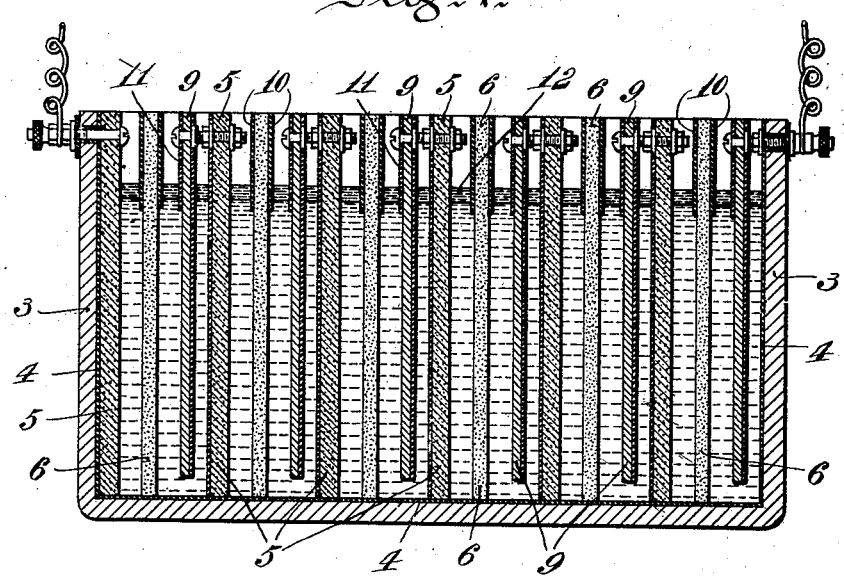
Figure 2:
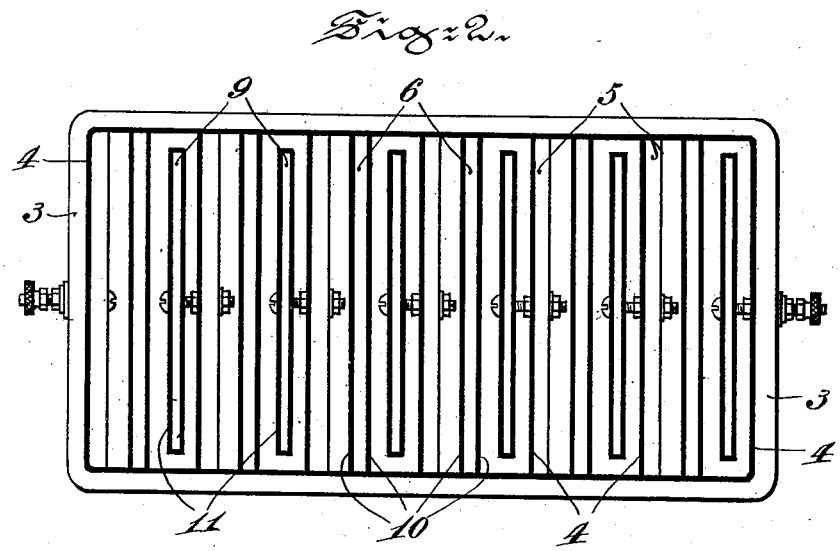

Referring to the drawings:—Figure 1 is a longitudinal vertical section of a battery comprising my invention suitable for open circuit work. Fig. 2 is a plan view of same.

Similar numerals refer to similar parts throughout the several views.

The receptacle 3 is made of any suitable material such as wood, iron, hard-rubber or celluloid. In case the receptacle is made of wood or iron it is desirable to line the same with a coating of insoluble non-conducting material 4. This receptacle is divided into a plurality of compartments by the carbon electrodes 5 seated in the box and sealed therewith, preferably by the coating of insoluble non-conducting material 4. In each compartment is placed a porous plate 6, formed of baked earthenware, or other suitable porous material, also sealed in three edges to the sides and bottom of the receptacle. The carbon electrodes are preferably coated on one side with suitable insoluble non-conducting material leaving the other surface active. Each compartment formed by the carbon plates 5 is provided with a galvanic couple, one electrode of which being one side or active surface of said carbon plate, the other electrode 9 being a positive electrode is formed of zinc. The porous plate above referred to is interposed between the zinc electrode and the active surface of the carbon plate. Each cell is provided with two liquids as follows: On the side of this porous plate containing the active surface of the carbon is provided a solution of ferric chlorid, while on the side containing the zinc electrode is provided a solution of sodium chlorid; these solutions being of the same density. The zinc electrodes are electrically connected and physically supported by the adjoining carbon electrode whose active face is in the adjoining cell. The immersed surfaces of the zinc electrode 9 and the carbon electrode 5 which face each other, are preferably coated with the insoluble non-conducting material 4. It is possible however, where the porous plate 6 is used to dispense ordinarily with the coating on the back of carbon plate 5. To prevent the evaporation of the solutions above referred to, I cover the same with a non-volatile oil 12, such for instance as paraffin oil. To prevent any electrical connection being formed by the oil between the above electrodes, I coat the porous plates 6 with a non-porous non-conducting material 10 extending from the top to slightly below the surface of the electrolyte. The simplest way of doing this is by glazing the upper end of the porous partition. I also coat the zinc electrode on its active side with an insoluble non-conducting material from the top to slightly below the surface of the electrolyte as indicated at 11.

I find an extremely cheap, durable and efficient coating of insoluble non-conducting material when used in connection with wooden receptacles is formed by first painting the interior of the receptacle with asphaltum paint and then pouring over this melted sealing wax or resin. These materials when applied in the manner stated, become so assimilated that when hard they form an almost indestructible coating.

What I claim is:—

1. In a primary battery, the combination of a receptacle divided into a plurality of separate cells by carbon plates suitably coated on one side with impervious material, each cell provided with a porous plate.

2. In a primary battery, the combination of a receptacle divided into a plurality of separate cells by carbon plates suitably coated on one side with impervious material, each cell provided with a galvanic couple, one electrode formed by one side of one of said carbon plates, and a porous plate interposed between the electrodes of each galvanic couple.

3. In a primary battery, the combination of a receptacle divided into a plurality of separate cells by carbon plates suitably coated on one side with impervious material, each cell provided with a galvanic couple, one electrode formed by one side of one of said carbon plates, a porous plate interposed between the electrodes of each galvanic couple, a sodium chlorid solution in each cell on one side of the porous plate and a ferric chlorid solution on the other side of the porous plate.

4. In a primary battery, the combination of a receptacle divided into a plurality of separate cells by carbon plates suitably coated on one side with impervious material, each cell provided with a galvanic couple, one electrode formed by one side of one of said carbon plates, a porous plate interposed between the electrodes of each galvanic couple, a sodium chlorid solution in each cell on one side of the porous plate and a ferric chlorid solution on the other side of the porous plate, the solutions being of the same density.

5. In a primary battery, the combination of a receptacle divided into a plurality of separate cells by carbon plates suitably coated on one side with impervious material, the active surface of each carbon plate forming one element of a galvanic couple, porous plates introduced between the electrodes of each galvanic couple, a sodium chlorid solution in each cell on the side of the porous plate in which is the positive electrode and a ferric chlorid solution on the other side of the porous plate, the said solutions being of the same density.

6. In a primary battery, the combination of a receptacle divided into a plurality of separate cells by partitions formed of carbon plates suitably coated on one side with impervious material, so that one surface of each carbon plate shall be electrically inactive, a zinc electrode in each cell, a porous plate interposed between the active surface of the carbon plate and the zinc electrode, and each cell being provided with a solution of sodium chlorid on the zinc electrode side of the porous plate and with a ferric chloride solution on the other side thereof, said solutions being of the same density.

CHARLES E. HITE.

Witnesses:
EUGENE ZIEGLER,
MAE HOFMANN.